(12) United States Patent
Covington

(10) Patent No.: US 6,827,848 B2
(45) Date of Patent: Dec. 7, 2004

(54) FILTER ELEMENT FOR OIL PANS AND FILTER ELEMENT/OIL PAN COMBINATION

(75) Inventor: Edward Allen Covington, Gastonia, NC (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/612,993

(22) Filed: Jul. 7, 2003

(65) Prior Publication Data

US 2004/0026306 A1 Feb. 12, 2004

Related U.S. Application Data

(63) Continuation of application No. 08/902,625, filed on Jul. 29, 1997, now Pat. No. 6,616,836.

(51) Int. Cl.[7] .............................................. B01D 35/027
(52) U.S. Cl. ................................... 210/172; 210/493.3
(58) Field of Search ................................ 210/168, 171, 210/172, 445, 450–452, 456, 474, 477, 493.1, 493.2, 493.3, 495; 55/497, 511, 521; 184/6.24, 106; 123/195 C, 196 A

(56) References Cited

U.S. PATENT DOCUMENTS

| 1,671,391 A | 5/1928 | Winslow et al. |
| 2,577,188 A | 12/1951 | Hall |
| 2,767,736 A | 10/1956 | Lackinger |
| 3,056,501 A | 10/1962 | Thorman et al. |
| 3,168,468 A | 2/1965 | Jagdmann |
| 3,397,518 A | 8/1968 | Rogers |
| 4,136,011 A | 1/1979 | Joseph et al. |
| 4,352,737 A | 10/1982 | Taniguchi |
| 4,507,203 A | 3/1985 | Johnston |
| 4,521,309 A | 6/1985 | Pall |
| 4,995,971 A | 2/1991 | Droste et al. |
| 6,616,836 B1 * | 9/2003 | Covington ................... 210/172 |

FOREIGN PATENT DOCUMENTS

| DE | 3822443 | 3/1989 |
| EP | 0712652 A1 | 5/1996 |
| GB | 474167 | 10/1937 |
| JP | 56-45643 | 10/1981 |

* cited by examiner

Primary Examiner—Matthew O. Savage
(74) Attorney, Agent, or Firm—Millen, White, Zelano & Branigan, P.C.

(57) ABSTRACT

A filter/oil pan assembly for use in devices such as transmissions for vehicles and for use as oil pans in internal combustion engines includes a housing having an upper chamber and a sump, wherein a filter element is disposed between the upper chamber and the sump. The filter element includes a filter media having pleats which extend in the direction parallel to the direction of movement of the vehicle utilizing the filter element. In order to facilitate flow through the filter element, all interior surfaces of the housing slope toward a well in which the filter element is positioned and the filter element itself has laterally projecting flanges which slope downwardly toward the filter media.

6 Claims, 4 Drawing Sheets

6,827,848 B2

FILTER ELEMENT FOR OIL PANS AND FILTER ELEMENT/OIL PAN COMBINATION

CROSS REFERENCE TO RELATED APPLICATIONS

This application is a continuation of U.S. patent application Ser. No. 08/902,625 filed on Jul. 29, 1997, now U.S. Pat. No. 6,616,836.

FIELD OF THE INVENTION

The present invention relates to filter elements for oil pans and to filter element/oil pan combinations. More particularly, the present invention relates to filter elements for use with oil pans and to a combination of filter elements and oil pans, which oil pans are useful for containing transmission fluid and lubricating oil associated with automotive vehicles.

BACKGROUND OF THE INVENTION

Automotive devices such as transmissions, both automatic and standard which use recirculating-transmission fluid, as well as internal combustion engines which use recirculating lubricating oil, filter the fluid and oil to remove particulate contaminants therefrom. In these devices, oil drains into oil pans prior to being recirculated back through the transmission or engine. In automatic transmissions, it is a practice to use a pan-type filter with a flow tube covered by a pan/tray with the tray acting as a sump for the fluid. Some sumps have a horizontal floor and others have an inclined floor. The filter life is determined by the area of the media and by utilization of the media in a way that provides good flow characteristics.

In order to decrease the cost of transmission maintenance by protecting the quality of the oil used as transmission fluid, there is a need to increase the life of the filter media, while improving efficiency and decreasing restriction thereof.

SUMMARY OF INVENTION

In view of the aforementioned considerations, it is a feature of the present invention to provide a new and improved filter element, wherein the filter element is configured for use in an oil pan useful in devices such as transmissions and internal combustion engines.

The invention is directed to a filter element used in a housing; wherein the filter element comprises a pleated filter media folded to provide upstream and downstream peaks having troughs therebetween, and wherein the filter media is mounted in a frame having side plate portions for sealing the ends of the troughs and laterally extending flanges which slope toward the filter media to direct the fluid being filtered onto the filter media.

In another aspect of the invention, the aforedescribed filter element is in combination with a housing, the housing being an oil pan for transmission fluid. The housing is divided into an upper chamber and a sump with the aforedescribed filter element being disposed between the upper chamber and sump.

In still another aspect of the invention, the aforedescribed filter element is used in combination with a housing that forms an oil pan for lubricating oil of an internal combustion engine.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
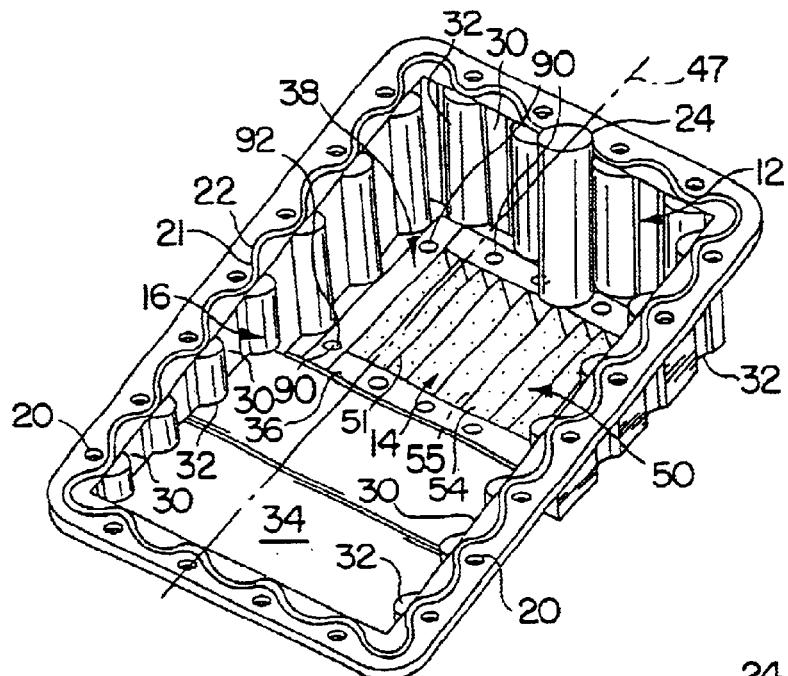
FIG. 1 is a top perspective view of an oil pan and filter configuration constructed and arranged in accordance with the principles of the present invention.
Figure 2:
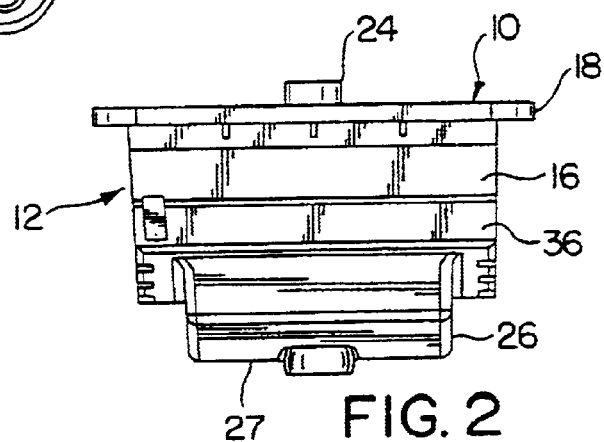
FIG. 2 is an end view of the oil pan of FIG. 1.
Figure 3:
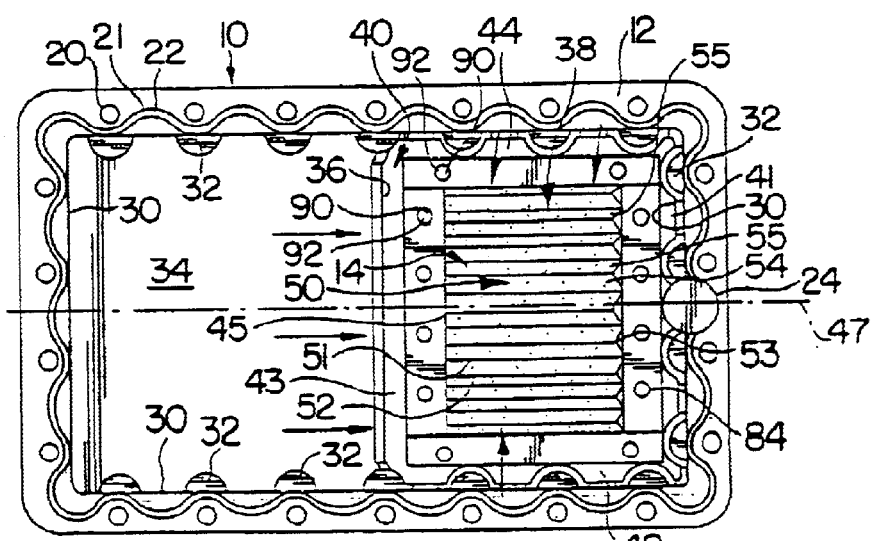
FIG. 3 is a top view of the oil pan of FIGS. 1 and 2.
Figure 4:
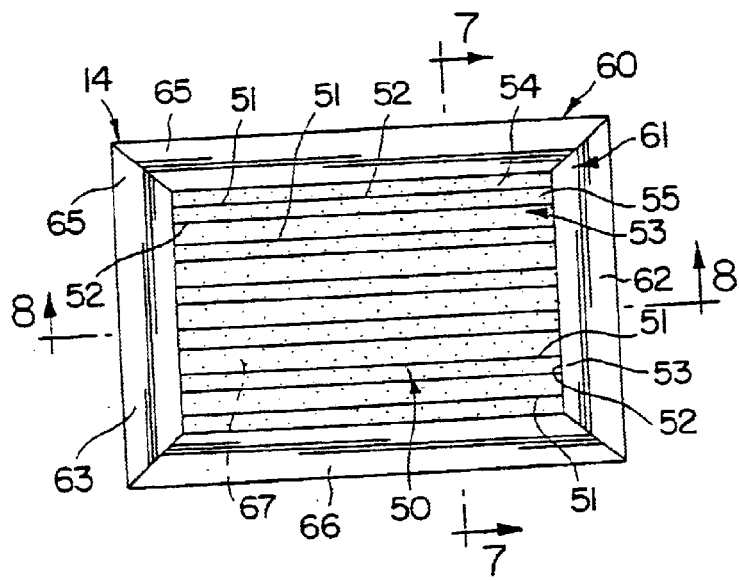
FIG. 4 is a top view of a filter element used with the oil pan of FIGS. 1-3.

Referring now to FIGS. 1-3, there is shown an oil pan/filter assembly 10 configured in accordance with the principles of the present invention, wherein the oil pan/filter assembly includes a housing 12 and a filter element 14. The assembly 10 of FIG. 1 is configured for use with an automatic transmission; however, the same general arrangement is useable with standard transmissions, semi-automatic transmissions and any transmission where recirculated transmission fluid or oil is utilized. In addition, the housing 12 has use as an oil pan with an integral filter 14 used as an oil pan/filter assembly for internal combustion engines.

The housing 12 comprises an upper chamber 16 having a laterally projecting mounting flange 18 disposed therearound. The laterally projecting mounting flange 18 has a plurality of bolt holes 20 therein for securing the housing to the bottom of an automatic transmission housing (not shown). A groove 21 is formed in the flange 18, the groove having a gasket 22 received therein for sealing with the transmission housing (not shown). In operation, oil enters the upper chamber 16 through an inlet (not shown) and is recirculated by a return pipe 24 after passing through the filter 14 which separates the upper chamber 16 from a sump 26 having a base 27 beneath which the return pipe 24 is connected. The return pipe 24 has the inlet of a suction pump (not shown) connected to the top thereof for pulling the filtered fluid from the sump 26 of the pan for recirculation back through the transmission (not shown).

The housing 16 has substantially vertical side walls 30 which include reinforcing ribs 32. A floor 34 in the upper chamber 16 of the housing 12 slopes toward the filter element 14 and the sump 26, so that all of the fluid within the upper chamber 16 is directed by the interior surfaces of the upper chamber toward the filter element and the sump 26. The sloping floor 34 terminates at an abrupt, substantially vertical wall 36 which forms a well portion 38 of the upper chamber 16, in which well portion the filter element 14 is seated. The seat for the filter element 14 is a land 40 which has four sloping surfaces 41, 42, 43 and 44 which slope toward the sump 26 and provide supporting surfaces for the filter 14, as well as defining an entrance 45 from the upper chamber 16 of the housing 12 to the sump 26.

The housing 12 has an axis 47 for mounting the oil pan/filter assembly 10 so that the axis is aligned with the direction of motion of the vehicle (not shown) on which the assembly is mounted. As is seen in FIGS. 1 and 3, the filter 14 has a pleated filter media 50 having upstream peaks and downstream peaks 51 and 52, respectively, which define peaks and valleys creating troughs 53 which extend parallel to the axis 47. The sides 54 and 55 of each trough 53 therefore act as dams to keep fluid in the troughs from shifting from one side of the filter element 14 to the other due to centrifical force as the vehicle turns.

Referring now to FIGS. 4–8, it is seen that the filter media 50 is rectangular and is mounted in a frame 60, wherein the frame includes a laterally extending flange arrangement 61 having front and rear lateral flanges 62 and 63, respectively, and side lateral flanges 65 and 66. The lateral flanges 62–66 each have upper surfaces which slope downwardly toward the filter media 50 and are disposed above an inlet face 67 of the filter media 50, which is defined by the plane which includes the upstream peaks 51 of the filter media pleats (an outlet face 68 being defined by the plane which includes the downstream peaks 52). The lower surfaces of the flanges 62–66 also slope toward the filter media 50 so that when the filter element 14 is nested within the well 38 of the upper chamber 16 within the housing 12, the lower surfaces abut substantially flat against the four support surfaces 41–44 of the land 40 (see FIGS. 1 and 3).

Figure 5:
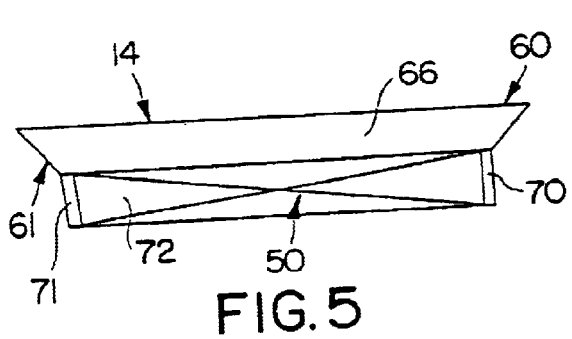
FIG. 5 is a side view of the filter element of FIG. 4, both side views being the same.
Figure 6:
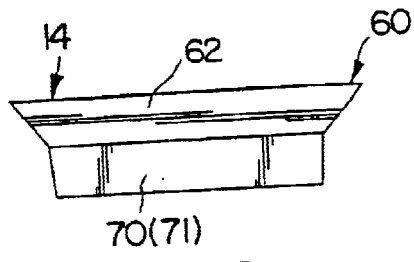
FIG. 6 is a front view of the filter element of FIG. 4, the back view being the same.
Figure 7:
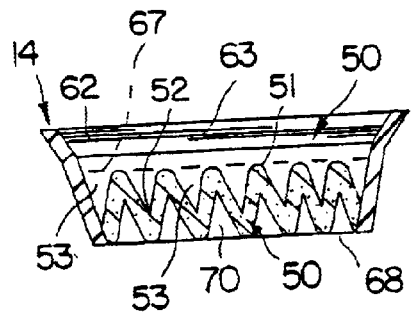
FIG. 7 is an elevation taken along lines 7—7 of FIG. 4.
Figure 8:
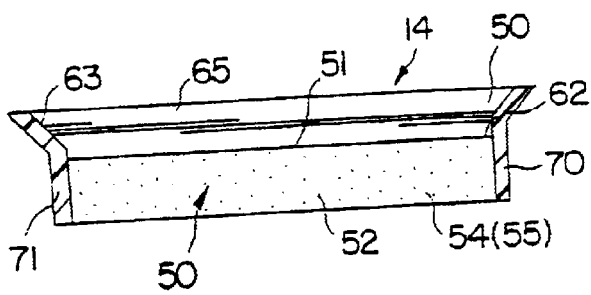
FIG. 8 is an elevation taken along lines 8—8 of FIG. 4.

It is necessary to seal the ends or terminuses of the troughs 53 and this is accomplished by a front side plate 70 and a rear side plate 71 which cover and seal the ends of the troughs, as is indicated in FIGS. 5 and 6. This keeps the oil to be filtered in the troughs 53 and prevents the oil from running out of the ends of the troughs. Preferably, the material of the filter media 50 at the ends of the troughs 53 is embedded in the nylon plates 70 and 71 by molding the plates onto the filter media 50 when forming the frame 60. There is only a need for the front and rear plates 70 and 71, since the oil being filtered flows through the outermost side panels 72 of the filter media 50; although, it may be desirable to have side plates to provide additional stiffeners for the frame 60.

Figure 9:
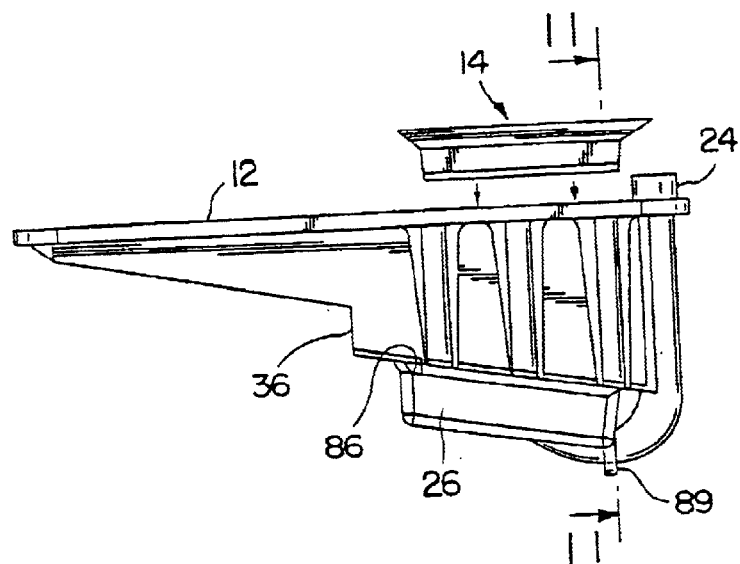
FIG. 9 is a side view showing the filter of FIGS. 4-8 being inserted into the oil pan of FIGS. 1-3.
Figure 10:
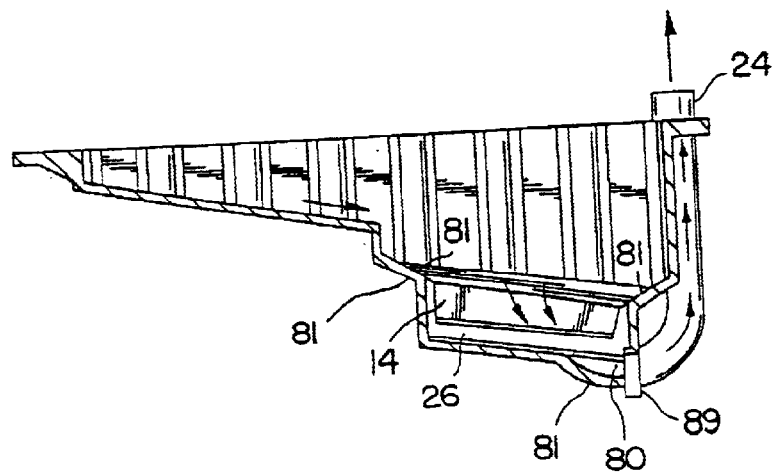
FIG. 10 is a cross-section taken along lines 10—10 of FIG. 3.
Figure 11:
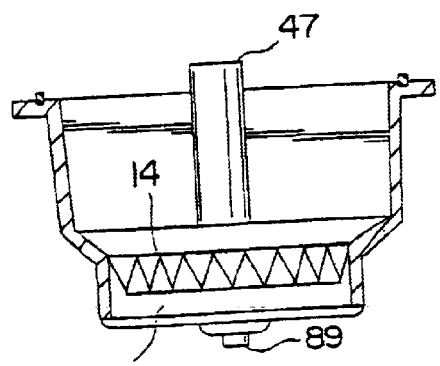
FIG. 11 is a cross-section taken along lines 11—11 of FIG. 3.

Referring now to FIGS. 9–11, it is seen in FIG. 9 that the filter element 14 is a separate component from the housing 12 and is inserted in the housing so as to nest therein, as seen in FIG. 10 (also in FIGS. 1 and 3).

As is seen in FIG. 10, the filter element 14 is mounted with the lateral flanges 62–66 abutting the sloping surfaces 41–44 of the land 40 so as to slope toward a drain area 80 of the sump 26. A gasket 81 is disposed between the land 40 and the lower surfaces of the laterally projecting flanges 62–66 of the filter element 14. In order to retain the filter element 14 in its nested position in the housing 12, the filter element 14 has a plurality of apertures 84 therein which receive post fasteners to provide a coupling arrangement to positively retain the filter element in place in the housing 12. The weight of the oil pressing down on the filter element, as well as suction applied to the return pipe 24, also serve to retain the filter element 14 seated against the land 40 of the housing 12.

If for some reason the filter element 14 becomes clogged, it is highly desirable to provide a bypass 26 so the fluid, whether the pan is a transmission oil pan or lubricating oil pan, if the pan is a lubricating oil pan, continues to circulate, even though the filter would block circulation. A bypass valve 86, which is normally closed but responds to increased pressure in the upper chamber 86, is disposed between the upper chamber 16 and the sump 26.

The drain area 80, beneath the base of the sump 26, includes a plug 89 which is used for sampling transmission oil and for draining oil if oil is to be changed between filter changes.

The housing 12 is preferably molded from a composite material such as "Nylon 6®" and, in one embodiment of the invention, may have the filter element 14 affixed thereto so as to be changed and disposed of with the housing 16 which is removed by loosening bolts holding the housing to the transmission via the bolt holes 20.

In another embodiment of the invention, the filter element 14 is detachable from the housing 12 by having the filter element retained on releasable fastening posts 90 which are received in apertures 92 in the flange 62–66 of the filter element 14. With this embodiment, the housing 12 is reused and the filter element 14 is discarded or recycled.

Figure 12:
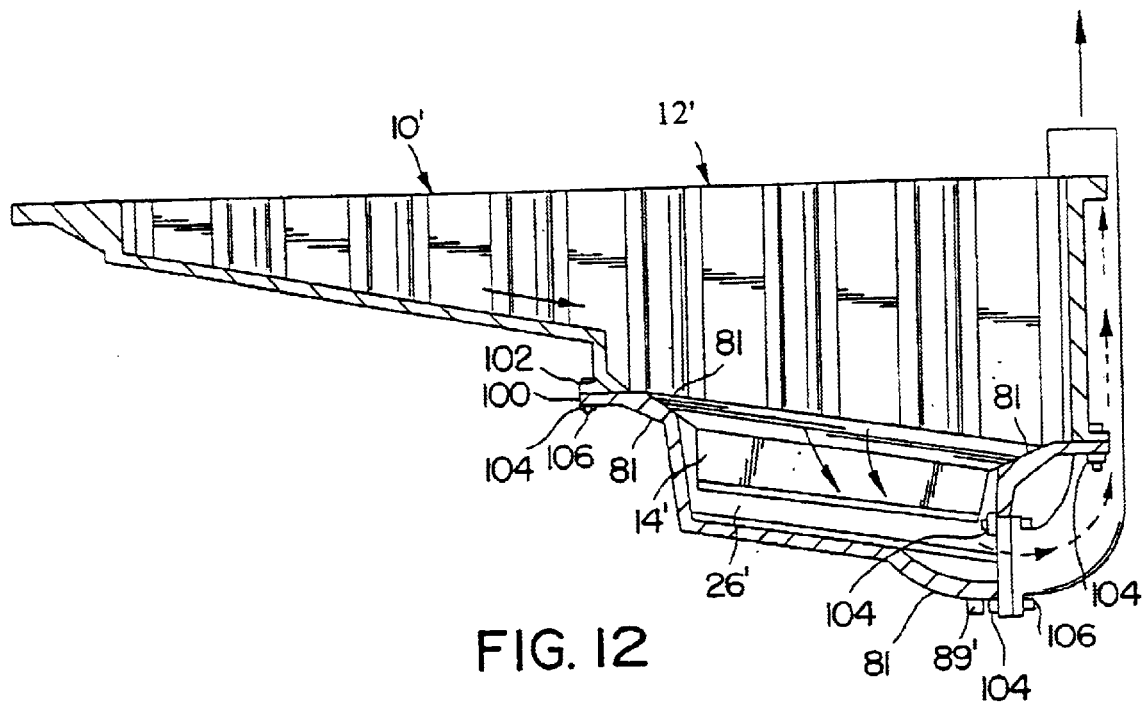
FIG. 12 is a partial cross-section similar to FIG. 10, illustrating an alternative embodiment of the invention with a sump and filter being detachable from the bottom of the oil pan.
Figure 13:
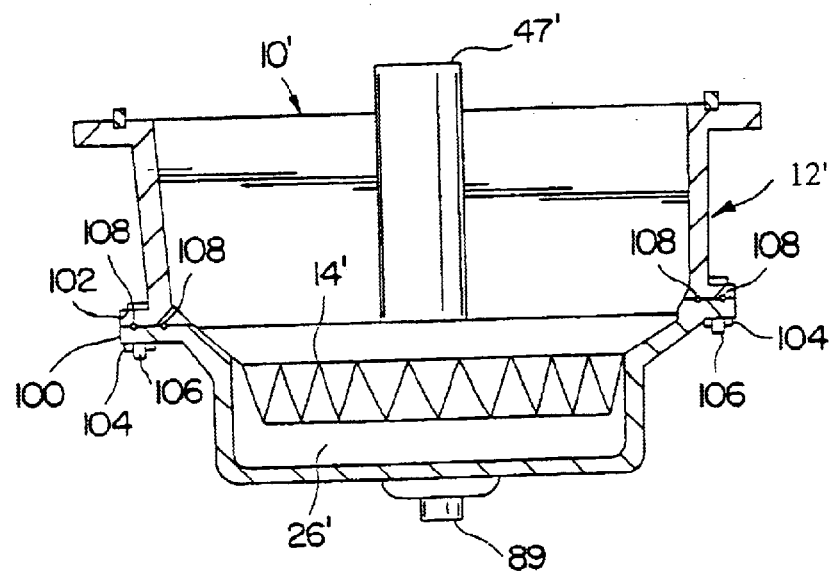
FIG. 13 is a cross-section similar to FIG. 11 of the alternative embodiment of FIG. 12.

In still another embodiment of the invention, as is set forth in FIGS. 12 and 13, a sump 26' is detachable from the housing 16' with the filter element 14', either integral with or readily detachable from the sump so that either the sump and filter are replaced as a unit on the filter is changed and the same sump reused. In both cases, the sump 26' has a peripheral flange 100 which is mounted on a peripheral flange 102 of the housing 16' with nuts 104 threaded on bolts 106 extending from the housing. Seals 108 are disposed between the flanges 100 and 102.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. An oil pan and filter assembly having an axis parallel to the direction an automotive vehicle normally travels, comprising:
   a housing adapted for attachment to an automotive vehicle device, the housing defining a space for accumulating oil on a floor of the housing, said floor leading to an opening to a sump in a direction that is generally parallel to said axis;
   a pleated filter media disposed in the opening to the sump, the filter media having a dirty side facing upwardly and a clean side facing the sump, the pleated filter media having peaks and valleys extending in a direction that is generally parallel to said axis to define troughs which keen a portion of the oil on the dirty side of the filter media from laterally shifting when the automotive vehicle turns; and
   a suction passageway from the sump to a location outside of the oil pan, the suction passageway adapted to be connected to a suction pump for pulling the oil out of the sump and conveying the oil out of the pan for recirculation.

2. The oil pan assembly of claim 1 wherein the automotive vehicle device is a transmission and the oil is transmission oil.

3. The oil pan assembly of claim 1 wherein the automotive vehicle device is an engine and wherein the oil is lubricating oil.

4. The oil pan and filter assembly of claim 1 wherein the filter media is separable from the opening so as to be replaceable.

5. The oil pan and filter assembly of claim 4 wherein the filter media is retained within a frame to provide a filter element, which filter element is separable from the oil pan so as to be replaceable.

6. The oil pan assembly of claim 1 wherein the suction passageway is a return pipe which is part of the oil pan.

* * * * *